(No Model.) 2 Sheets—Sheet 1.

C. P. HENRIKSON.
CUT-OFF FOR STEAM ENGINES.

No. 391,320. Patented Oct. 16, 1888.

WITNESSES.
F. L. Durand
Benj. T. Cowl

INVENTOR.
Carl P. Henrikson
By Louis Bagger & Co.
Attorneys.

(No Model.) 2 Sheets—Sheet 2.

C. P. HENRIKSON.
CUT-OFF FOR STEAM ENGINES.

No. 391,320. Patented Oct. 16, 1888.

WITNESSES,
F. L. Ourand,
Benj. G. Cowl

INVENTOR,
Carl P. Henrikson,
by Louis Bagger & Co.
Attorneys.

UNITED STATES PATENT OFFICE.

CARL P. HENRIKSON, OF PRENTISS BAY, MICHIGAN.

CUT-OFF FOR STEAM-ENGINES.

SPECIFICATION forming part of Letters Patent No. 391,320, dated October 16, 1888.

Application filed February 7, 1888. Serial No. 263,211. (No model.)

*To all whom it may concern:*

Be it known that I, CARL P. HENRIKSON, a citizen of the United States, and a resident of Prentiss Bay, in the county of Mackinac and State of Michigan, have invented certain new and useful Improvements in Cut-Offs for Steam-Engines; and I do hereby declare that the following is a full, clear, and exact description of the invention, which will enable others skilled in the art to which it appertains to make and use the same, reference being had to the accompanying drawings, which form a part of this specification, and in which—

Figure 1:
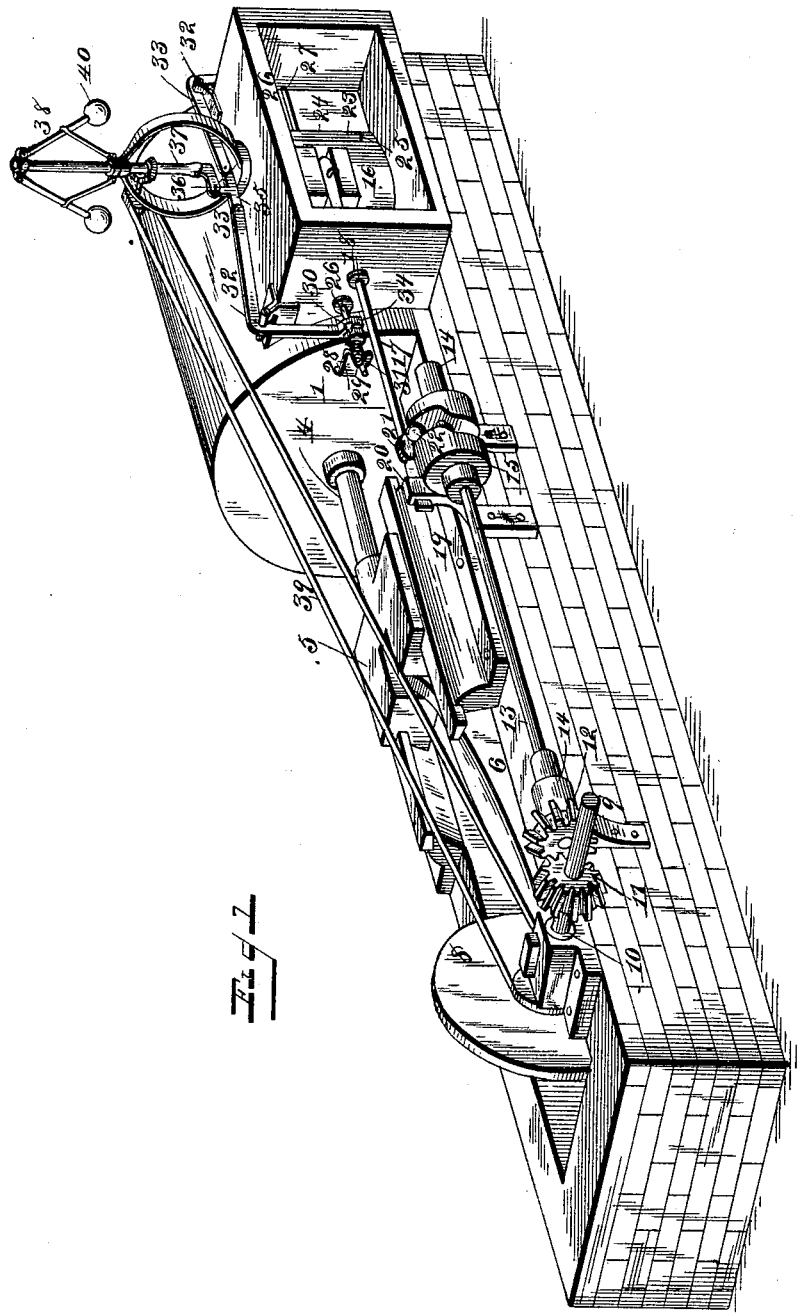
Figure 2:
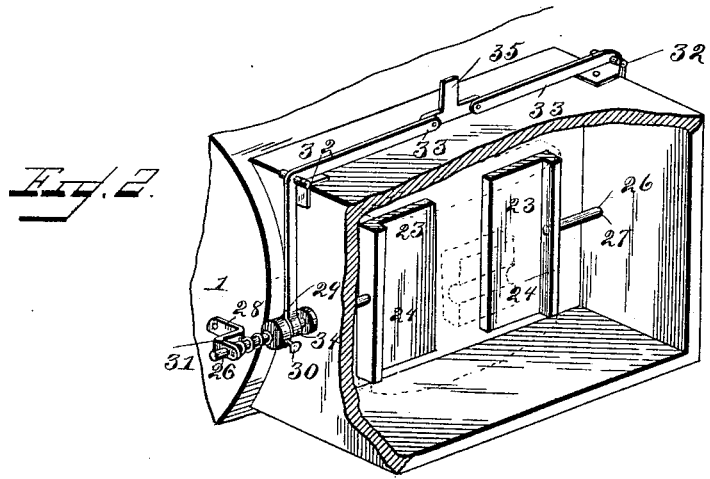
Figure 3:
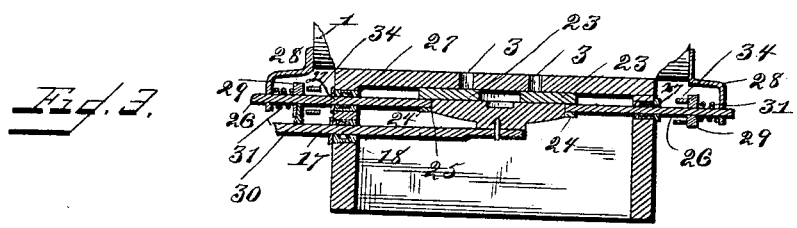
Figure 4:
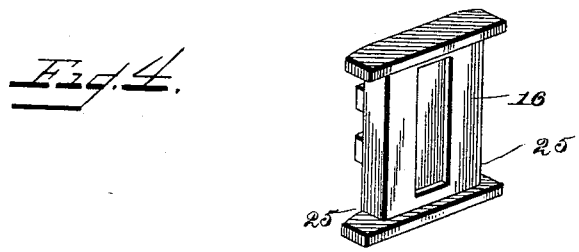

Figure 1 is a perspective view of a steam-engine provided with my new and improved automatic cut-off and regulator, the side of the steam-chest in which the valve plays being removed. Fig. 2 is a perspective side view, on an enlarged scale, of the cut-off mechanism working in and secured to the steam-chest, the side of the steam-chest being broken away and the slide-valve being indicated by dotted lines. Fig. 3 is a longitudinal vertical central sectional view through the steam-chest, and Fig. 4 is a detail view of the slide-valve.

The same numerals of reference indicate corresponding parts in all the figures.

My invention consists in a new and improved automatic cut-off and regulator for steam-engines, which will be hereinafter fully described and claimed.

Referring to the several parts by their designating-numerals, 1 indicates the engine-cylinder, and 2 the steam-chest, through which latter the steam passes from the boiler into the cylinder through the ports 3 3.

4 indicates the piston-rod, which is secured at its outer end in the usual sliding cross-head, 5, and 6 indicates a pitman, which is pivotally secured at one end to the said cross-head and at its other end is journaled on the wrist-pin of a disk or wheel, 8. This wheel 8 is secured rigidly on the lower end of a horizontal shaft, 9, which turns in a bearing, 10, and has keyed upon its upper end a bevel-pinion, 11, the teeth of which mesh with the teeth of a bevel-pinion, 12, which is keyed on the outer end of a horizontal shaft, 13. This shaft 13 turns in bearings 14 14, and has secured upon it near its inner end the cam 15, of the form shown.

16 indicates the slide-valve, of ordinary construction, and in the grooved or recessed part of this valve is pivotally secured the inner end of the valve-rod 17. This valve-rod 17 extends through a suitable opening, 18, in that end of the steam-chest, and its flattened outer end, 19, slides in a guide-bearing, 20, as shown. The valve-rod is formed near its outer end with the upwardly-projecting pin or spindle 21, on which is journaled the small roller 22, which projects into the groove or recess in the cam 15, and it will be seen that as the piston of the engine is reciprocated back and forth in and out, the shaft 9 will be rotated through the connecting-pitman 6, and the disk at the lower end of the said shaft and the horizontal shaft 13 will be driven through the bevel-pinions 11 12, thereby rotating the cam on the said shaft, and as the upward projection on the outer end of the valve-rod 17 travels in the groove of the cam the slide-valve will be reciprocated back and forth, as will be readily seen. The small roller 22 reduces friction and causes those parts to work easily.

23 23 indicate the flanged plates, which may be called the "valve-plates." These are flat metal plates, which are bent at their outer ends at right angles to form end flanges, 24, the flat part of these plates fitting snugly under the ends of the slide-valve 16, as shown. These plates are not quite as wide as the valve, and the ends of the valve are recessed at 25 to permit of the upwardly-bent ends of the plates fitting snugly to the ends of the valve. From the outer bent end of each of the said valve-plates extends a rod, 26, these rods passing out through small openings 27 27 in the ends of the steam-chest. The outer end of each rod 26 plays through a perforated stationary bearing, 28, which is secured to its end of the cylinder 1, and upon each rod 26, between this stationary bearing and the end of the steam-chest, is secured, by means of a set-screw, 30, a ring or small collar, 29. These collars 29 can thus be adjusted on the rods 26, so as to regulate the amount of steam admitted into the cylinder 1, as hereinafter set forth.

Upon the outer end portion of each of the rods 26 is placed a spiral spring, 31—or any other suitable spring could be employed—this spring encircling the rod between the stationary end bearing, 28, and the collar or ring 29, which is held stationary when adjusted by the set-screw 30. It will be readily seen that the tendency of these spiral springs will be to press the valve-plates 23 23 in and hold them in contact with the ends of the slide-valve, to and under which the said plates snugly fit. By this arrangement, when the slide-valve is slid toward one end of the steam-chest and pushes the flanged plate at that end out toward the end of the chest, the spiral spring on the rod of the other plate forces the said other plate along, causing it to follow the valve and always keep in contact with it, or as nearly in contact with its end as the adjusted ring 29 will permit.

It will be seen that the rings 29 may be adjusted on the rods 26 and secured in their adjusted positions by the set-screws 30, so to regulate or adjust the space between the said valve-plates, and consequently the amount of steam passing from the steam-chest into the cylinder as the slide-valve reciprocates. The spiral springs will hold the valve-plates pressed in, with the rings 29 on each rod 26 in contact with the ends of the levers 33 33, hereinafter described, and it will be seen that by adjusting the rings 29 the valve-plates can be drawn farther apart, so as to increase the space between their flanged outer ends and the recessed ends of the slide-valve, so that as the said valve reciprocates the plates will be moved less for a shorter space than if their flanged ends were both in contact with the ends of the valve. The ports 3 will then be only partly opened on each stroke of the valve, and the amount of steam passing from the chest into the cylinder will be consequently decreased, as will be readily understood. The valve-plates can thus be adjusted by hand, and they are automatically regulated and adjusted by the mechanism which will be now described.

At the outer corners on one side of the steam-chest are centrally pivoted in bearings 32 32 L-shaped or elbow levers 33 33, each of the said levers being formed with a bifurcated end, 34, which encircles or fits around the valve-plate rod 26 at its end of the steam-chest between the adjustable collar or ring 29 and the end of the steam-chest. The adjacent ends of the levers 33 at the side of the steam-chest are pivoted to the ends of a T-shaped link, 35, the projecting upper end of which is pivoted to the inner end of a small elbow-lever, 36, the other end of this centrally-pivoted elbow-lever being pivotally connected to the governor-rod 37 of a governor, 38, of any ordinary and suitable construction. This governor is driven by a band, 39, from the wheel 8 on the end of the horizontal shaft 9, the shaft 9 being driven, as before set forth, by the piston of the engine itself through the connecting-pitman 6.

In operation, when the engine is working at its normal rate of speed, the ends of the large elbow-levers 33 33 will stand parallel with the ends of the steam-chest, the slide-valve reciprocating back and forth in the steam-chest, and the collars or rings 29 29 having been previously adjusted on the rods 26, so as to fix the amount of steam which will be admitted into the cylinder through the ports 3 3 as long as the engine is running at its normal rate of speed. As soon, however, as the engine rises above this fixed rate of speed and begins to run too fast, the slide-valve reciprocating too rapidly, the revolving balls or weights 40 of the governor will rise, thus forcing down the governor-rod and, through the small elbow-lever 36, pushing the connected ends of the large elbow-levers 33 33 together in against the side of the steam-chest, thus forcing their other ends apart, and as these bifurcated ends are forced apart they will, pressing against the rings 29 29 on the rods 26, push the said rods out against the tension of the spiral springs 31 31, and thus automatically draw the flanged valve-plates 23 23 farther apart, so that they will both lie directly over the ports 3 3 at the same time, and so that they will not be moved by the reciprocating valve, and the steam will thus be automatically cut off from the cylinder and cannot enter the same. The speed of the engine will then decrease to its normal rate, and the balls or weights 40 40 of the governor falling will restore the elbow-levers 33 33 to their normal positions, when the pressure of the compressed springs 31 31 will slide the plates 23 23 in again, as before, and the normal quantity of steam will be admitted through the ports 3 as the valve reciprocates.

From the foregoing description, taken in connection with the accompanying drawings, the construction, operation, and advantages of my invention will be readily understood. It will be seen that my invention is comparatively simple in construction and strong in all its parts, so that it is not liable to get out of order in any manner, while it is exceedingly efficient and satisfactory in its operation. By means of the adjustable rings 29, with their set-screws 30, the amount of steam normally admitted into the cylinder through the ports 3 3 can be regulated as desired, while the governor and connecting apparatus described will automatically operate to keep the speed of the engine at the desired rate, as fully described and set forth.

Having thus described my invention, what I claim, and desire to secure by Letters Patent of the United States, is—

1. The combination, with the revolving shaft having the cam secured upon it, of the slide-valve having the projection upon the outer end of its valve-rod, the flanged valve-plates having the rods working at their outer ends in the stationary bearings, the adjustable collars on the said rods, and the springs arranged as described, substantially as set forth.

2. The combination, with the reciprocating slide-valve, of the flanged valve-plates having the rods working at their outer ends in stationary bearings, the adjustable collars on the said rods, the springs arranged as described, the centrally-pivoted elbow-levers having the bifurcated ends, the T plate or link pivotally connecting the adjacent ends of the said levers, the small elbow-lever, and the governor, substantially as and for the purpose set forth.

3. The combination, with the cylinder and the piston-rod thereof, of the cross-head, the connecting-pitman, the vertical shaft having on its lower end the band-wheel formed with the wrist-pin and having upon its upper end the bevel-pinion, the horizontal shaft having on its outer end the bevel-pinion and on its inner portion the cam, the slide-valve having the projection upon the outer end of its valve-rod, the flanged valve-plates having the rods working at their outer ends in stationary bearings, the adjustable collars on the said rods, the springs arranged as described, the centrally-pivoted elbow-levers having the bifurcated ends, the T plate or link pivotally connecting the adjacent ends of the said levers, the small elbow-lever, the governor, and the band or belt, all substantially as and for the purpose set forth.

In testimony that I claim the foregoing as my own I have hereunto affixed my signature in presence of two witnesses.

CARL P. HENRIKSON.

Witnesses:
JAMES GROVER,
ANDREW SIMS.